(12) United States Patent
Buttridge et al.

(10) Patent No.: US 8,888,077 B1
(45) Date of Patent: Nov. 18, 2014

(54) LIQUID DISTRIBUTOR

(75) Inventors: Ian G. Buttridge, Garland, TX (US);
Soo Woong Kim, Flower Mound, TX (US); Gil Jong Kim, Seoul (KR); Michael J. Binkley, Glenn Heights, TX (US)

(73) Assignee: GTC Technology US LLC, Houston, TX (US)

( * ) Notice: Subject to any disclaimer, the term of this patent is extended or adjusted under 35 U.S.C. 154(b) by 0 days.

(21) Appl. No.: 13/564,881

(22) Filed: Aug. 2, 2012

Related U.S. Application Data

(63) Continuation of application No. 12/418,189, filed on Apr. 3, 2009, now Pat. No. 8,517,352.

(60) Provisional application No. 61/042,519, filed on Apr. 4, 2008, provisional application No. 61/201,121, filed on Dec. 5, 2008.

(51) Int. Cl.
*B01F 3/04* (2006.01)
*B01D 3/20* (2006.01)
*B01D 3/00* (2006.01)

(52) U.S. Cl.
CPC . *B01D 3/008* (2013.01); *B01D 3/20* (2013.01)
USPC ............................................. 261/97; 261/110

(58) Field of Classification Search
USPC .................................. 261/97, 110
See application file for complete search history.

(56) References Cited

U.S. PATENT DOCUMENTS

| | | |
|---|---|---|
| 2,582,826 A | 1/1952 | Glitsch |
| 2,718,901 A | 9/1955 | Nutter |
| 2,752,139 A | 6/1956 | Huggins |
| 2,752,229 A | 6/1956 | Brown et al. |
| 2,787,453 A | 4/1957 | Hibshman et al. |
| 2,853,281 A | 9/1958 | Hibshman et al. |
| 2,903,251 A | 9/1959 | Thrift |
| 2,951,691 A | 9/1960 | Nutter |
| 3,039,751 A | 6/1962 | Versluis |
| 3,048,957 A | 8/1962 | Middleton |
| 3,080,155 A | 3/1963 | Glitsch et al. |
| 3,087,711 A | 4/1963 | Glitsch |
| 3,143,482 A | 8/1964 | McLeod et al. |
| 3,146,280 A | 8/1964 | Forgrieve |
| 3,233,708 A | 2/1966 | Glitsch |

(Continued)

FOREIGN PATENT DOCUMENTS

EP          010877 B1     3/1983

OTHER PUBLICATIONS

Binkley, Michael, "U.S. Appl. No. 12/408,333,", filed Mar. 30, 2009.

(Continued)

*Primary Examiner* — Charles Bushey
(74) *Attorney, Agent, or Firm* — Winstead PC

(57) ABSTRACT

A liquid flow distributor for positioning above one or more packing sections in a packed exchange tower includes a plurality of troughs. At least one trough in the plurality of troughs has along a side thereto a deflecting member. The deflecting member is angulated to generally follow a shape of the at least one trough. A diffuser side of the deflecting member is positioned to deposit the liquid into a discharge region. A deflector side of the deflecting member is positioned for deflecting ascending vapor away from the discharge region.

11 Claims, 3 Drawing Sheets

(56) References Cited

U.S. PATENT DOCUMENTS

| | | |
|---|---|---|
| 3,245,669 A | 4/1966 | Huggins et al. |
| 3,282,576 A | 11/1966 | Bruckert et al. |
| 3,287,004 A | 11/1966 | Nutter |
| 3,338,566 A | 8/1967 | Kittel |
| 3,399,871 A | 9/1968 | Bon |
| 3,463,464 A | 8/1969 | Nutter et al. |
| 3,729,179 A | 4/1973 | Keller |
| 3,759,494 A | 9/1973 | Axelrod et al. |
| 3,959,419 A | 5/1976 | Kitterman |
| 4,120,919 A | 10/1978 | McClain |
| 4,133,852 A | 1/1979 | DiNicolantonio et al. |
| 4,174,363 A | 11/1979 | Bruckert |
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,933,047 A | 6/1990 | Bannon |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A * | 7/1998 | Ulrich et al. .............. 261/97 |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,568,663 B1 | 5/2003 | Xu et al. |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 | 10/2003 | Gage |
| 6,722,639 B2 | 4/2004 | Ender et al. |
| 6,739,585 B1 | 5/2004 | Urbanski et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,235,158 B2 | 6/2007 | Matsumoto et al. |
| 7,270,315 B2 | 9/2007 | Burton et al. |
| 7,540,476 B2 | 6/2009 | Pilling et al. |
| 7,556,734 B2 | 7/2009 | Lee et al. |
| 7,712,728 B2 | 5/2010 | Kehrer |
| 7,896,039 B2 * | 3/2011 | Bachmann et al. ........... 141/286 |
| 8,006,716 B2 | 8/2011 | Zhang et al. |
| 8,720,870 B2 | 5/2014 | Pilling et al. |
| 2002/0041040 A1 * | 4/2002 | Fischer et al. .................. 261/98 |
| 2003/0067085 A1 | 4/2003 | Shakur et al. |
| 2004/0037759 A1 | 2/2004 | Van Vliet et al. |
| 2004/0151643 A1 | 8/2004 | McDougald et al. |
| 2004/0182013 A1 * | 9/2004 | Kehrer .............................. 52/11 |
| 2007/0126134 A1 | 6/2007 | Xu et al. |
| 2007/0295591 A1 | 12/2007 | Mosler |
| 2008/0018003 A1 | 1/2008 | Pilling et al. |
| 2008/0245651 A1 | 10/2008 | Werlen et al. |
| 2008/0277260 A1 | 11/2008 | Binkley et al. |
| 2010/0288624 A1 | 11/2010 | Kim et al. |
| 2011/0278745 A1 | 11/2011 | Pilling et al. |
| 2012/0024977 A1 | 2/2012 | Buttridge et al. |
| 2012/0118399 A1 | 5/2012 | Binkley et al. |
| 2012/0211347 A1 | 8/2012 | Kim et al. |
| 2012/0300577 A1 | 11/2012 | Buttridge et al. |

OTHER PUBLICATIONS

Buttridge, Ian G. "U.S. Appl. No. 12/418,189", filed Apr. 3, 2009.
Binkley, Michael J., "U.S. Appl. No. 13/951,159", filed Jul. 25, 2013.
Glitsch, Inc., "Ballast Tray Design Manuel", Bulletin 4900, Sixth Edition, 1993, (40 pages).
Kister, Henry Z., "Distillation Design", ch. 6, pp. 265, 296, 331, 299-301, ch. 7, pp. 382-394, ch. 9, pp. 537-554, McGraw-Hill, 1992.
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.
Young, Lee W., "International Search Report" for the International Application PCT/IB11/02695 as mailed Apr. 17, 2012. (4 pages).
Kim, SooWoong et al., "U.S. Appl. No. 13/401,601,", filed Feb. 21, 2012.
Buttridge, Ian et al., "U.S. Appl. No. 13/449,122,", filed Apr. 17, 2012.
Buttridge, Ian G., "U.S. Appl. No. 13/564,881,", filed Aug. 2, 2012.
Pilling Mark, et al., Mini Valve, Hydrocarbon Engineering, Apr. 2013 [3 pages].

* cited by examiner

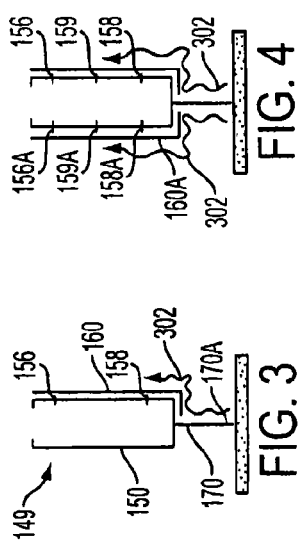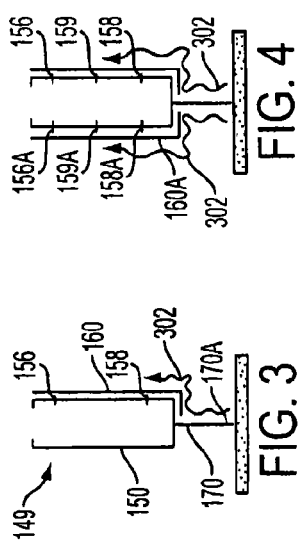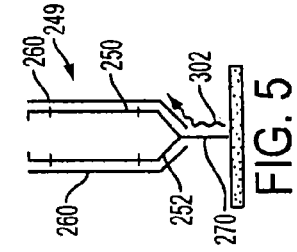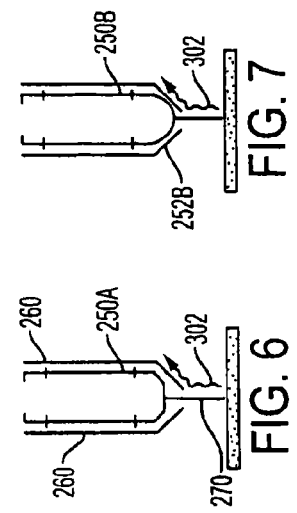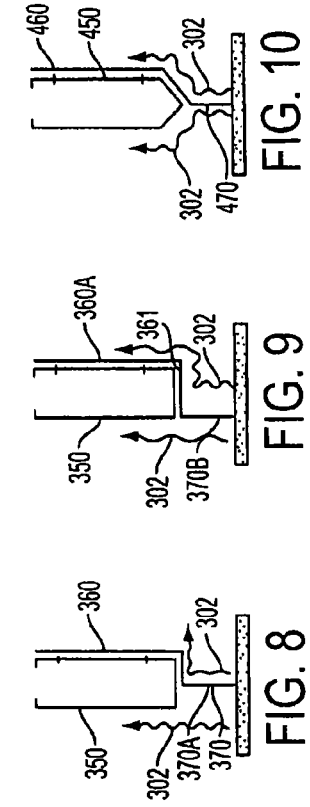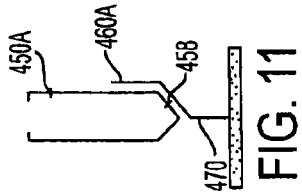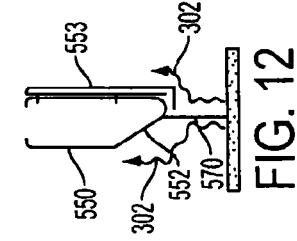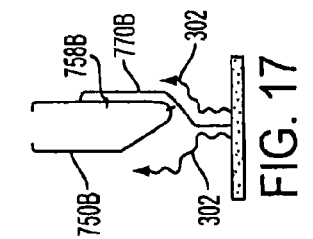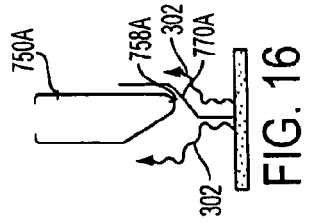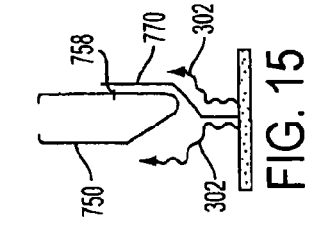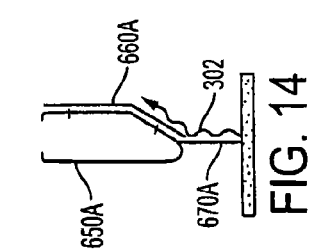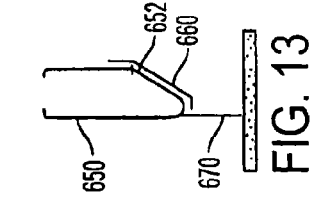

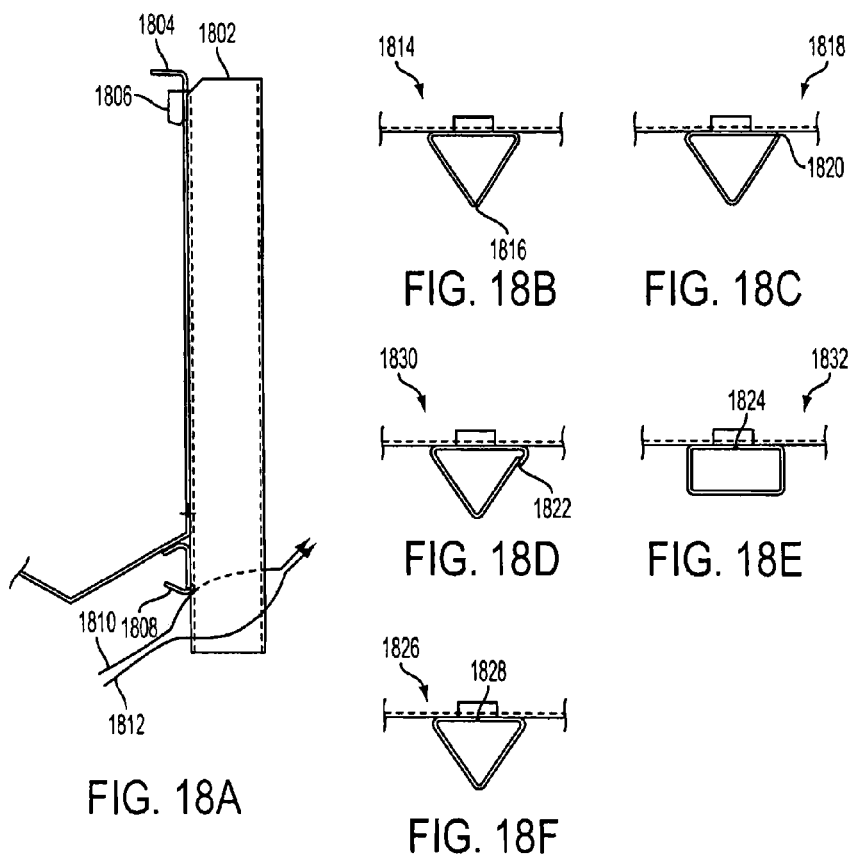

LIQUID DISTRIBUTOR

CROSS-REFERENCE TO RELATED APPLICATIONS

This patent application is a continuation of, and incorporates by reference the entire disclosure of, U.S. patent application Ser. No. 12/418,189, filed Apr. 3, 2009 now U.S. Pat. No. 8,517,352 B1. U.S. patent application Ser. No. 12/418, 189 claims priority from U.S. Provisional Patent Application No. 61/042,519, filed Apr. 4, 2008, and U.S. Provisional Patent Application No. 61/201,121, filed Dec. 5, 2008. U.S. Provisional Patent Application Nos. 61/042,519 and 61/201, 121 are incorporated herein by reference.

BACKGROUND

1. Technical Field

The present invention pertains to liquid distributors and methods for vapor-liquid contact towers, and, more particularly, but not by way of limitation, to distributor troughs having one or more of deflector baffles, diffuser plates or tubes in configurations allowing liquid to be spread into a continuous film dispersed onto underlying packing in a chemical process tower.

2. History of Related Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through and in a particular zone or zones of minimum dimensions defining the area and volume thereof. These are prerequisites of efficient operation and are necessary for close fractionation. For this reason, counter-current flow of vapor and liquid within such exchange columns have become established methods of such vapor-liquid contact in the prior art. The actual vapor-liquid interface requires the utilization of a packing bed within the column. Liquid is then distributed atop the packing bed in the most feasible manner while vapor is distributed beneath the packing bed in the lower region of the tower. In this manner, liquid trickling downwardly through the packing bed is exposed to the vapor ascending therethrough for vapor-liquid contact and interaction.

It is well established that the configuration of the packing bed determines the pressure drop, capacity and efficiency of the vapor-liquid interface and the concomitant mass and energy transfer occurring in a process tower. The means for effective and even distribution of the vapor and the liquid on opposite ends of the packing bed as well as maintenance of that distribution therethrough are critical to an efficient operation. Only with efficient initial vapor and liquid distribution and the maintenance of said distribution throughout the packing bed will homogenous mixing zones be created therethrough for maximizing the efficiency therein. Efficiency is readily convertible to cost of operation and production quality. For this reason, a myriad of prior art packing designs have been prevalent in conventional exchange columns. The efficiency of the packing is, however, limited to a large extent by the efficiency of the vapor and liquid distribution thereacross. For example, failure of either vapor or liquid to evenly distribute over cross sections of the packing effectively eliminates the utility of the part of the packing where there is poor or no distribution which in turn is directly proportional to the efficiency and cost-effectiveness of the operation. The packing bed depths are critical in establishing production criteria and operational costs and failure to evenly distribute vapor-liquid and/or maintain homogeneity within the packing bed can lead to serious consequences, particularly in the petroleum refining industry.

Aside from the packing beds themselves, the liquid distributor is the most important unit of a tower internal. Failure in performance of a packed tower sometimes stems from liquid distribution problems such as clogging or uneven distribution and thus the selection of a correct liquid distributor is critical for uninterrupted plant operation. Operational considerations thus include the functional aspects of the distributor, such as how level the distributor troughs are maintained, how well the floor is equalized therethrough, and the means through which the liquid is distributed from the troughs to the packing beds therebeneath. Also considered is the effect which the ascending vapor has on the liquid being distributed. When vapor flow areas are restricted flow velocity can increase to the point of interrupting the descending flow pattern. The liquid is, in essence, "blown" around, and this condition can lead to uneven distribution and inefficiency in the process column.

Conventional liquid distributors generally include the multi-orifice spray head variety adapted for dispersing liquid in the form of a spray atop a packing bed. In the utilization of dump packing wherein a plurality of random oriented packing elements are disposed, within the exchange column, such a liquid distribution technique is sometimes effective. This is true particularly when high efficiency parameters are not of critical significance.

The cost of high efficiency packing of the type set forth in the aforesaid patent commands attention to proper vapor-liquid distribution. Even small regions of non-homogenous interaction between the vapor and liquid is an expensive and wasteful loss not consistent with the utilization of high efficiency packing, where space and homogeneity in vapor-liquid interface is both expected and necessary for proper operation. High efficiency packing typically requires counter-current vapor-liquid flow through the channels defined by opposed corrugations of sheets disposed therein. If the initial liquid or gas distribution fails to enter a particular corrugation pattern, then precious surface area is lost in the packing until the liquid and vapor are urged to migrate into and interact through the unfilled regions of the packing. Only by utilizing proper vapor and liquid distribution means may effective and efficient utilization of high efficiency packing as well as conventional dumped packing be assured.

The development of systems for adequate liquid distribution in process towers has been limited as set forth above. In the main, it is known to discharge and distribute liquids with spray orifices, pipes, perforated plates, apertured troughs and nozzles. Gas is concomitantly discharged in an ascending turbulent configuration to provide adequate vapor distribution. Although many prior art systems are generally effective in distributing some vapor and some liquid to most portions of the packing bed, uniform distribution thereacross is usually not obtained without more sophisticated distribution apparatus. For example, unless gas is injected into a myriad of contiguous areas beneath the packing bed with equal pressure in each area, the mass flow of vapor upwardly through the packing bed cannot be uniform. Random vapor discharge simply distributes unequal amounts of vapor across the lower regions of the packing bed but does not in any way assure equality in the distribution. Likewise the simple spray of liquid atop the packing bed, though intended to be effective in wetting all surface areas, often results in high concentrations of liquid flow in certain packing bed areas and less flow in others. This, of course, depends on the spray device. Orifice distributors are generally more susceptible to plugging than other types of distributors, and plugging is generally non-uniform to uneven irrigation within the tower. Surface irregularities in a distributor pan occurring during manufacture likewise increase flow resistance of some perforations or induce liquid flow along the bottom of the pan which is a distinct disadvantage. Any flow irregularity which focuses the flow in one area while reducing flow in other areas is deleterious.

It has been discovered that with pipe distributors consisting of headers equipped with tributary pipes or laterals that have holes or nozzles to spray liquid, the liquid is often distributed too finely. Tiny drops of the liquid then get carried out of the tower by counter-current gas flow. This prevents the liquid from even coming in contact with the packing bed. Since liquid contact is the purpose of the packing therebeneath, such a result totally frustrates the intent of the liquid distributor. As much as 5% of the liquid flowing through a nozzle can be converted to mist at a pressure drop of 20 psi. It has also been noted that nozzle equipped pipe distributors can produce overlapping spray patterns which result in increased flow in certain areas with reduced flow in other areas. Moreover, spray headers also release liquid at speeds that can cause it to pass vertically through the packing before it has a chance to spread out horizontally depending on the particular packing type.

These issues are important as well as the critical issue of the number of liquid distribution points necessary for various tower diameters, packing heights, materials and systems. It is critical that the packing height not be too great wherein the weight of the packing will cause it to crush itself. However, liquid redistributors between packing sections are expensive and take up heights that could otherwise be used for mass transfer. One consideration is the type of packing being used. Structured packing is best in deep bed depths; however, liquid distribution must be uniform.

In light of the above, various liquid distributor designs have been developed for addressing such critical issues. The following U.S. Patents specifically set forth for the purposes of describing earlier designs addressing liquid distribution. These patents include U.S. Pat. No. 6,722,639 to Ender; U.S. Pat. No. 6,293,526 to Fischer; U.S. Pat. No. 5,906,773 to Hausch; U.S. Pat. No. 4,909,967 to Binkley; U.S. Pat. No. 4,855,089 to Michels; U.S. Pat. No. 4,816,191 to Berven; U.S. Pat. No. 4,729,857 to Lee; U.S. Pat. No. 5,051,214 to Chen; U.S. Pat. No. 5,192,465 to Petrich; and U.S. Pat. No. 6,502,806 to Richardson. These patents illustrate various embodiments of liquid distribution for chemical process towers.

Unfortunately, the manifestation of uneven liquid distribution generally occurs in the vicinity of the most even, or uniform, vapor distribution. The opposite is also true. This is because vapor has had a chance to more evenly distribute through the packing bed prior to engaging the liquid distribution flow. It would be an advantage, therefore, to provide means for even liquid and vapor distribution prior to entry of said vapor and liquid into the packing bed and in a manner providing both a uniform spread of said liquid and vapor and uniform volumetric distribution thereof.

The present invention provides such an improved system of vapor-liquid distribution through a trough distributor wherein each trough distributor is constructed with a particular configuration facilitating maximum efficiency. In some embodiments, deflector plates, baffles and/or tubes may be utilized in accordance with the principles of the present invention as well as various configurations of the trough itself.

SUMMARY OF THE INVENTION

A packed exchange tower, the packed exchange tower being of a type wherein vapor is injected therein for ascension therethrough and liquid is dispersed therethrough for downward flow, includes one or more packing sections disposed in the tower for facilitating interaction of vapor and liquid passing in a counter-flow therethrough and one or more liquid flow distributors for positioning above the one or more packing sections for even distribution of liquid downwardly therethrough. The one or more liquid flow distributors include a plurality of troughs for dispersing the liquid thereacross, at least one trough in the plurality of troughs having along a first side thereto a first deflecting member, the first deflecting member being used in conjunction therewith for maximizing efficiency of vapor-liquid interaction. The first deflecting member has a deflector side facing outwardly of the at least one trough and a diffuser side facing the at least one trough, the first deflecting member being angulated to generally follow a shape of the at least one trough. The diffuser side of the first deflecting member is positioned to deposit the liquid into a discharge region therebeneath and above the one or more packing sections, the discharge region being accessible to ascending vapor from a side generally beneath the first side of the at least one trough. The deflector side of the first deflecting member is positioned for deflecting at least some of the ascending vapor ingressing on the side generally beneath the first side of the at least one trough away from the discharge region.

A method for uniformly distributing liquid flow through a packed exchange tower, the packed exchange tower being of a type wherein vapor is injected therein for ascension therethrough and liquid is dispersed therethrough for downward flow, includes disposing one or more packing sections in the tower for facilitating the interaction of vapor and liquid passing in a counter-flow therethrough, positioning one or more liquid distributors above the one or more packing sections for even distribution of the liquid downwardly therethrough, the one or more liquid distributors including a plurality of troughs, and disposing a first deflecting member along a first side of at least one trough in the plurality of troughs for maximizing efficiency of vapor-liquid interaction. The first deflecting member has a deflector side and a diffuser side, the first deflecting member being angulated to generally follow a shape of the at least one trough. The method further includes allowing liquid to flow downwardly on a diffuser side of the first deflecting member into a discharge region therebeneath and above the one or more packing sections. The discharge region is accessible to ascending vapor from a side generally beneath the first side of the at least one trough. The method additionally includes deflecting, via the deflector side of the first deflecting member, at least some of the ascending vapor ingressing on the side generally beneath the first side of the at least one trough away from the discharge region.

A liquid flow distributor for positioning above one or more packing sections in a packed exchange tower, the packed exchange tower being of a type wherein vapor is injected therein for ascension therethrough and liquid is dispersed therethrough for downward flow, includes a plurality of troughs for dispersing the liquid thereacross. At least one trough in the plurality of troughs has along a first side thereto a first deflecting member, the first deflecting member being used in conjunction therewith for maximizing efficiency of vapor-liquid interaction. The first deflecting member has a deflector side facing outwardly of the at least one trough and a diffuser side facing the at least one trough, the first deflecting member being angulated to generally follow a shape of the at least one trough. The diffuser side of the first deflecting member is positioned to deposit the liquid into a discharge region therebeneath and above the one or more packing sections, the discharge region being accessible to ascending vapor from a side generally beneath the first side of the at least one trough. The deflector side of the first deflecting member is positioned for deflecting at least some of the ascending vapor ingressing on the side generally beneath the first side of the at least one trough away from the discharge region.

BRIEF DESCRIPTION OF THE DRAWINGS

A more complete understanding of the method and apparatus of the present invention may be obtained by reference to the following Detailed Description when taken in conjunction with the accompanying Drawings wherein:

For a more complete understanding of the present invention and for further objects and advantages thereof, reference may now be had to the following description taken in conjunction with the accompanying drawings in which:

FIG. 3 is a diagrammatical, side-elevational, cross-sectional view of one embodiment of a liquid distributor;

FIG. 4 is a diagrammatical, side-elevational, cross-sectional view of another embodiment of a liquid distributor;

FIG. 5 is a diagrammatical, side-elevational, cross-sectional view of another embodiment of a liquid distributor;

FIG. 6 is a diagrammatical, side-elevational, cross-sectional view of another embodiment of a liquid distributor;

FIG. 7 is a diagrammatical, side-elevational, cross-sectional view of another embodiment of a liquid distributor;

FIG. 8 is a diagrammatical, side-elevational, cross-sectional view of another embodiment of a liquid distributor;

FIG. 9 is a diagrammatical, side-elevational, cross-sectional view of another embodiment of a liquid distributor;

FIG. 10 is a diagrammatical, side-elevational, cross-sectional view of another embodiment of a liquid distributor;

FIG. 11 is a diagrammatical, side-elevational, cross-sectional view of another embodiment of a liquid distributor;

FIG. 12 is a diagrammatical, side-elevational, cross-sectional view of another embodiment of a liquid distributor;

FIG. 13 is a diagrammatical, side-elevational, cross-sectional view of another embodiment of a liquid distributor;

FIG. 14 is a diagrammatical, side-elevational, cross-sectional view of another embodiment of a liquid distributor;

FIG. 15 is a diagrammatical, side-elevational, cross-sectional view of another embodiment of a liquid distributor;

FIG. 16 is a diagrammatical, side-elevational, cross-sectional view of another embodiment of a liquid distributor;

FIG. 17 is a diagrammatical, side-elevational, cross-sectional view of another embodiment of a liquid distributor; and FIGS. 18A-18F comprise a series of drawings representing various embodiments of drip tubes.

DETAILED DESCRIPTION OF ILLUSTRATIVE EMBODIMENTS OF THE INVENTION

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

Figure 1:
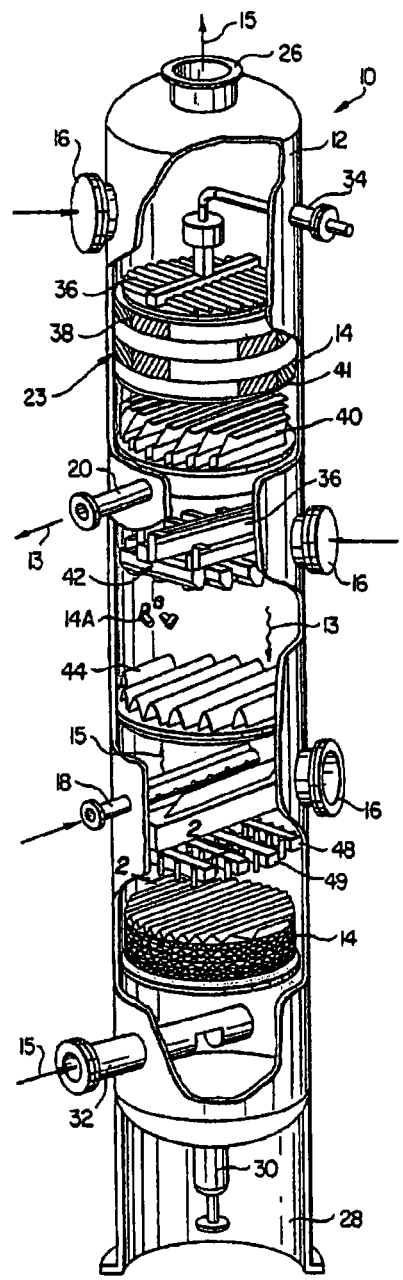
FIG. 1 is a perspective view of a packed column with various sections cut away for illustrating a variety of tower internals.

Referring first to FIG. 1, there is shown a perspective view of a packed exchange tower or column with various sections cut away for illustrating a variety of internals. The exchange column 10 of FIG. 1 comprises a cylindrical tower 12 having a plurality of packing bed layers 14 disposed therein. A plurality of manways 16 are likewise constructed for facilitating access to the internal region of the tower 12 for replacement of the packing beds 14. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the packing beds, and is enriched or added to by material which condenses into it out of the vapor stream.

Still referring to FIG. 1 the exchange column 10 further includes a vapor outlet, overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the packing layers 14. Reflux from condensers is provided in the upper toward region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for purpose of illustration and include a liquid collector 40 disposed beneath a support grid 41 in support of the upper structured packing 38. A liquid redistributor 42 is likewise disposed therebeneath and an intermediate support plate 4 is provided in an alternative configuration of the type adapted for supporting random packing 14A of a ring or saddle variety as representatively shown. A lower grid 46 is illustrated disposed beneath a liquid distributor 48 comprising a plurality of troughs 49 adapted for dispersing the liquid 13 thereacross in counter-current flow to the ascending vapor therebeneath. It may be seen from this figure that the countercurrent configuration between the ascending vapor 15 and the descending liquid is the subject of a plurality of critical design considerations including liquid/vapor ratios, liquid cooling, foaming and the presence of solids or slurries therein. Corrosion is likewise a consideration of the various elements in the packed towers and the selection of the material in the fabrication of the tower internals is in many instances the results thereof.

Figure 2:
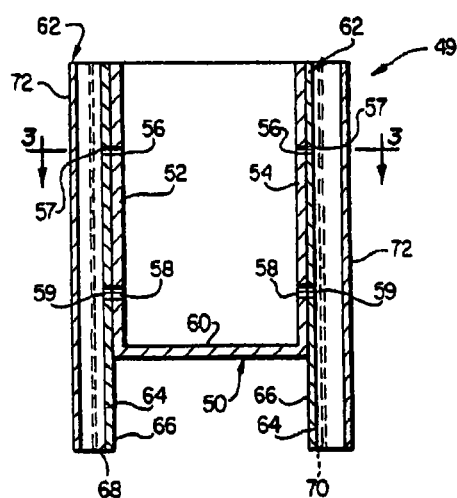
FIG. 2 is an enlarged side-elevational, cross-sectional view of the liquid flow distributor of FIG. 1.

Referring now to FIG. 2 there is shown an enlarged end-elevational cross-sectional view of the prior art trough 49 of FIG. 1 having a lower body section 50. This particular embodiment of prior art liquid distribution is most fully set forth in U.S. Pat. No. 4,909,967. The trough section 50 is comprised of outer walls 52 and 54 upstanding from a bottom surface 60. A series of upper apertures 56 and lower apertures 58 are formed in the side walls 52 and 54 for purposes of allowing liquid flow outwardly of the trough 49. Outwardly of the apertures 56 and 58 is a removable distributor tube assembly adapted for receiving the flow of liquid therefrom and channeling said liquid downwardly into a packing bed therebeneath (not shown). Each tube assembly 62 comprises a modified U-shaped channel 64 that is secured to the side wall of the trough 49 by arc welding or the like. The channel 64 is constructed with a substantially planar base wall 66 and two upstanding side wall lips 68 and 70. Only one of the side walls 68 and 70 is shown on opposite sides of trough 49 in FIG. 2 because of the cross-sectional angle, and then only in phantom. What is shown is an aperture 57 formed in base wall 66 in line with aperture 56 and an aperture 59 formed in base wall 66 in line with aperture 58. A generally V-shaped channel 72 of mating size is received within the U-shaped channel 64 in slidable engagement therewith providing the necessary assemblage for serving as a flow distributor drip tube that is both efficient and removable.

Referring now to FIG. 3 there is shown a diagrammatical, side-elevational, cross-sectional view of a liquid flow distributor trough 149 having a lower body section 150. The trough section 150 is comprised of side walls and a bottom along with a series of apertures formed in the side walls for allowing liquid flow outwardly therefrom in the manner generally described in FIG. 2 for prior art trough 49. It should be recognized that liquid distributor troughs will, by definition, have side walls and a bottom as well as apertures and/or other means of liquid discharge and the description of the various embodiments of the present invention for FIGS. 3-17 is presented herein in illustration of the various aspects of the present invention relative to the utilization of a trough design in a chemical process tower of the general type shown in FIGS. 1 and 2. In some instances, upper and lower discharge apertures will be set forth, shown, and described. The apertures allow liquid flow outwardly from the trough. In some embodiments, tubes may be secured to the outside of the trough. It should be noted that the prior art trough of FIGS. 1 and 2 are illustrated with tubes utilized for flow distribution in the form of a distributor tube. In the present invention, distributor tubes may or may not be used.

Still referring to FIG. 3, the liquid is discharged from the trough 150 through upper and lower apertures 156 and 158 formed in the side wall of the trough. Disposed outwardly of the apertures 156 and 158 is deflector baffle 160 constructed in a generally reverse L-shaped configuration and disposed such that the lower region thereof is generally or perpendicular to and spaced from a diffuser plate 170. The diffuser plate 170 may be welded to and/or an extension of the trough itself. The exact method of manufacture may vary in accordance with the principles of the present invention.

Still referring to FIG. 3, as liquid is discharged from upper and lower apertures 156 and 158, the liquid flows down an inner side of the deflector baffle 160, also referred to herein as a diffuser side, and is deposited beneath the trough 150 and above the underlying packing, also referred to herein as a discharge region. Specifically, in the discharge region, the liquid is discharged against surface 170A of diffuser plate 170 which allows the liquid to spread out and be uniformly distributed across the underlying packing therebeneath. As shown in FIG. 3, ascending vapor 302 ingressing toward descending liquid flow in the discharge region engages an outer side of the deflector baffle 160, also referred to herein as a deflector side. Thus, the ascending vapor 302 may be deflected away from the discharge region. Other means to lower the operating pressure drop and reduce entrainment are also afforded by the designs of multiple ones of the other configurations in FIGS. 5-17.

Referring now to FIG. 4, there is shown an alternative configuration of the distributor trough of FIG. 3. When liquid discharge is present on both sides of a distributor trough, as depicted in FIGS. 4-7, more than one deflector baffle may be necessary. Accordingly, in FIG. 4, a second deflector baffle 160A is shown along with a second set of apertures 156A and 158A. Optional rows of apertures may also be included as required, which are, for example, shown in FIG. 4 as 159 and 159A. As described above, ascending vapor 302 engages a deflector side of the second deflector baffle 160A. In this manner, the ascending vapor 302 is deflected so as to minimize interference with the discharge of liquid evenly across the diffuser plate. FIGS. 5-7 depict additional embodiments including two deflector baffles.

Referring now to FIG. 5, there is shown yet another embodiment of the present invention wherein a distributor trough 249 includes sidewalls 250 and an angulated bottom region 252 which forms a generally V-shaped configuration. This shape of trough reduces pressure drop, and likewise in FIGS. 6-7 and FIGS. 10-17. Likewise, a pair of deflector baffles 260 is provided on opposite sides of the trough 250 and positioned to discharge liquid against a single diffuser plate 270 depending from the angulated bottom region 252 of the trough 250.

Referring now to FIG. 6, there is shown a trough 250A also having a pair of oppositely disposed deflector baffles 260, but further having a variation in that diffuser plate 270 depends from a substantially planar bottom region of the trough 250A. Similarly, in FIG. 7, a trough 250B is shown with a bottom region 252B that is of arcuate and/or otherwise curved configuration as compared to the angular configuration of FIG. 6.

Referring now to FIG. 8, there is shown a trough 350 similar to that shown in FIG. 3, except that the diffuser plate 370 is not connected directly to the bottom of the trough 350, but, instead, to the deflector baffle 360. It may be seen that the liquid descending from the apertures and side wall of the trough 350 would spread along surface 370A of diffuser plate 370.

Referring now to FIG. 9, there is shown the trough 350 of FIG. 8 with a variation in the deflector baffle. A deflector baffle 360A is constructed to have a lower region 361 extending substantially across the bottom of the trough 350 such that the diffuser plate 370B is positioned, not in the center, but generally beneath a side of the trough 350. In various embodiments, a non-fouling orifice or aperture may be formed in the bottom of the trough 350 for discharge of liquid against the lower region of the deflector baffle 360A. Examples of non-fouling orifices or apertures in a bottom region of a trough are discussed below relative to FIGS. 11 and 16-17.

Referring now to FIG. 10, there is shown a distributor trough 450 similar in design to the distributor trough of FIG. 5 wherein an angulated bottom region is formed therewith. In this particular embodiment, a deflector baffle 460 is angulated such that it is connected directly to the diffuser plate 470 disposed therebeneath. In this manner, ascending vapor 302 is diverted upwardly and around the trough 450 as shown.

Referring now to FIG. 11, there is shown an alternative embodiment of the trough of FIG. 10. In this particular embodiment, trough 450A includes a non-fouling orifice 458 formed in one of the angulated sidewalls for discharge of liquid against the deflector baffle. The deflector baffle includes a continuous diffuser plate 470 formed therebeneath. In this particular embodiment, the deflector baffle 460A does not extend as far upwardly along the side of the trough for 450A but this is only one embodiment of the present invention.

Referring now to FIGS. 12-17, in combination, there is shown a series of alternative embodiments of distributor trough shapes as compared to those set forth in FIGS. 3-11. In these particular embodiments, the distributor trough is formed with angulated side and/or bottom walls that may be of angled and curvilinear formation to provide improvement relative to both a discharge of liquid as well as the deflection of the ascending vapor 302. In this manner, entrainment is reduced and efficiency is increased.

Referring now specifically to FIG. 12, there is shown a distributor trough 550 with an angulated bottom region 552 to further facilitate the deflection of ascending vapor 302 as shown. In this particular configuration, an optional tube 553 is shown to further facilitate the control of the liquid discharge from the trough 550. Likewise the diffuser plate 570 of this particular configuration is shown to be connected to, and extending from, the bottom region 552 of trough 550.

Referring now to FIG. 13, a distributor trough 650 is shown comprising an angulated bottom region 652 oppositely disposed to that of trough 550 shown in FIG. 12. In this particular embodiment, it is shown that a tubular baffle may be utilized, although, in this particular illustration, a baffle 660 is shown adapted for discharging liquid onto a diffuser plate 670 connected directly to the bottom region of trough 650. A variation of this design is shown in FIG. 14, where the deflector baffle 660A is angulated to receive the discharge from the trough 650A from two apertures formed therein. The liquid is then discharged beneath the trough into the discharge region. Specifically, the liquid is discharged upon a diffuser plate 670A depending directly from the lower region of the trough 650A.

Referring now to FIG. 15, a distributor trough 750 having an angulated construction similar to that shown in FIG. 12 is illustrated with a contiguous deflector baffle and diffuser plate assembly 770 adapted for receiving the discharge of liquid from a single aperture 758. As represented on the drawings hereof, the contiguous deflector baffle and diffuser plate 770 may likewise include and/or be replaced by a tube assembly used in conjunction therewith. The effectiveness of the deflection of ascending vapor 302 due to angulation of various members are shown herein. This similar labeling is represented also in FIG. 16 wherein the distributor trough 750A, having a single lower discharge aperture 758A formed in a bottom region of the trough 750A, discharges onto a single contiguous deflector baffle and diffuser plate 770A in such a configuration facilitates liquid flow through orifices and prevents fouling. The liquid discharge aperture 758B shown FIG. 17 for trough 750B has a similar design except for the location of the liquid discharge aperture. Likewise, an optional modification of the contiguous deflector baffle and diffuser plate 770B is shown where the uppermost portion is closed and in contact with a side wall of the trough 750B. Closure prevents ascending vapor 302 from passing therethrough in a manner that could interfere with uniform liquid flow.

In operation, the various embodiments of the present invention shown in FIGS. 3-17 facilitate the discharge of liquid in a chemical vapor-liquid process column having ascending vapor therein and utilize the discharge from the various embodiments of the trough that allows the liquid to be spread out across a diffuser plate to form an even film that is discharged onto structured packing disposed beneath to enhance the vapor-liquid interaction therebetween. In accordance with the principles of the present invention, the various embodiments herein facilitate the vapor being deflected from and not entering the channel between the trough and the deflector baffle so as to cause entrainment. The various vapor flow arrows shown in FIGS. 3-17 illustrate the advantages of the present invention in preventing liquid entrainment which reduces the mass transfer efficiency in a chemical process column.

Various embodiments of the present invention are thus designed to prevent blasts of vapor from hitting the various orifices that are ejecting liquid from the troughs so as to cause liquid entrainment. By vectoring the vapor away from the trough in the manner shown, protection is afforded. This has multiple advantages, including causing less turbulence and less pressure drop. Various angles are shown herein, but many different angles are contemplated within spirit and scope of the present invention. Angles can also vary in either direction. No particular angle is suggested herein as limiting the scope of the present invention and the various angles shown are to indicate a configuration that is designed to facilitate smooth vapor flow so as to reduce any pressure drop and reduce any entrainment. Likewise, the various embodiments of apertures in the bottom and side walls of the troughs are not to be considered as limiting in that other configurations are also contemplated. One specific reason that an orifice would be positioned on the bottom of a trough is so that any debris or solids within the trough and carried by the liquid would not easily plug the orifice. By having the position as shown herein, solids plugging an orifice would be "flushed out."

Further to the discussion of the operation of the present invention set forth above, it may be seen that various angles, as well as tapers, of the trough are shown. The tapers, may, in some configurations be an advantage over a flat plate and/or the use of tubes. Likewise, tubes or conduit for the liquid discharge of the orifice may, in certain embodiments and operations, be more advantageous than not having such tubes. It is fully contemplated within the spirit and scope of the present invention that either tubes for deflector plates and/or contiguous deflector baffle and diffuser plate varieties have as set forth and shown herein may be utilized in accordance with principles of the present invention.

It may be seen that the various embodiments of the present invention are further designed to prevent the entrainment of liquid in the chemical process tower during certain operations. For example, it should be noted that at higher velocities, the closed configurations of FIG. 17 and the like would probably be the best way to ensure that the least amount of entrainment is manifested from liquid discharge. Similar considerations occur when flow configurations start to flood the underlying structured packing.

Referring now to the drawings of FIGS. 18A-18F, it may be seen that a one-piece drip tube having a closed-sided construction may be advantageous. By closed-sided construction, the applicants herein refer to a closure of side and back walls of the drip tube in the construction thereof. Referring now to FIG. 18A, a one-piece, closed-sided drip tube 1802 is shown in a straight configuration attached to a trough 1804 via hooks 1806 and 1808. In various embodiments, because of the close-sided construction of the drip tube 1802, ascending vapor from beneath the trough, as described above, is not given direct access for flow into the drip tube 1802. Rather, ascending vapor flows in the directions of arrows 1810 and 1812 around the drip tube 1802. In this manner, liquid entrainment resulting from, for example, high velocity vapor flow may be greatly reduced.

Referring now to FIGS. 18B-18F, it may be seen in the drawings that both triangular as well as rectangular configurations of drip tubes are shown. For example, in FIGS. 18B-18D and 18F, triangular configurations 1814, 1818, 1830, and 1826 are shown. By way of further example, in FIG. 18E, rectangular configuration 1832 is shown. Other shapes such as arcuate, oval, and circular may also be utilized in accordance with the principals of the present invention. The drip tubes are shown to be closed by way of closures 1816, 1820, 1822, 1824, and 1828. In some embodiments, the closures may be spring-lock closures as shown with closure 1822 in FIG. 18D.

In addition to the configurations shown in FIGS. 18A-18F, it may be seen that, in various embodiments, the one-piece, closed-sided drip tubes as shown herein may be configured to be bent, angulated, or S-shaped relative to a trough to discharge generally in a discharge region beneath the trough. It may also be seen that the one-piece, closed-sided drip tubes as shown herein may be attached to the trough by various attachment approaches. A combination of hooks may be utilized and/or single-point welding in various embodiments. Likewise, snap-on and bolt-on configurations may be incorporated for attachment of a closed-sided drip tube in accordance with the principles of the present invention. Finally, the various embodiments of the present invention illustrate methods of, and apparatus for reducing the disturbance of liquid discharge from the various distributor troughs. As set forth above, reductions in pressure drop and entrainment further facilitates and enhances capacity and efficiency in a vapor-liquid contact column.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. A packed exchange tower, the packed exchange tower being of a type wherein vapor is injected therein for ascension therethrough and liquid is dispersed therethrough for downward flow, the packed exchange tower comprising:
   one or more packing sections disposed in the tower for facilitating the interaction of vapor and liquid passing in a counter-flow therethrough;
   one or more liquid flow distributors for positioning above the one or more packing sections for even distribution of the liquid downwardly therethrough, the one or more liquid flow distributors including:
      a plurality of troughs for dispersing the liquid thereacross, at least one trough of the plurality of troughs being configured for dispersing the liquid in a single-deflecting-member configuration, the at least one trough having along a first side thereto a single deflecting member, the single deflecting member being used in conjunction therewith for maximizing efficiency of vapor-liquid interaction;
      a diffuser plate extending from the single deflecting member, the single deflecting member discharging the liquid against the diffuser plate for uniformly distributing the liquid across the plurality of packing sections, the diffuser plate extending below the single deflecting member;
      the single deflecting member having a deflector side facing outwardly of the at least one trough and a diffuser side facing the at least one trough, the single deflecting member being angulated to generally follow a shape of the at least one trough;
      the deflector side of the single deflecting member being positioned for deflecting ascending vapor away from the downward flow of the liquid on the diffuser side; and
      wherein the single deflecting member extends along a length of the selected side of the at least one trough and is constructed in a generally reverse L-shaped configuration such that a lower region thereof is generally perpendicular to and spaced from the diffuser plate.

2. The packed exchange tower of claim 1, wherein the diffuser plate is disposed generally perpendicularly to a bottom region of the at least one trough.

3. The packed exchange tower of claim 1, wherein the diffuser plate is positioned generally beneath a side of the at least one trough.

4. The packed exchange tower of claim 1, wherein the diffuser plate is positioned generally centrally beneath the at least one trough relative to a horizontal plane.

5. A packed exchange tower, the packed exchange tower being of a type wherein vapor is injected therein for ascension therethrough and liquid is dispersed therethrough for downward flow, the packed exchange tower comprising:
   one or more packing sections disposed in the tower for facilitating the interaction of vapor and liquid passing in a counter-flow therethrough;
   one or more liquid flow distributors for positioning above the one or more packing sections for even distribution of the liquid downwardly therethrough, the one or more liquid flow distributors including:
      a plurality of troughs for dispersing the liquid thereacross, at least one trough of the plurality of troughs having a shape including:
         a curvilinear formation on a first side of a bottom region thereof; and
         an angulated formation on a second side of the bottom region thereof, the second side being opposite the at least one trough to the first side;
      a deflecting member along a selected side of the at least one trough for use in conjunction with the at least one trough for maximizing efficiency of vapor-liquid interaction;
      the deflecting member having a deflector side facing outwardly of the at least one trough and a diffuser side facing the at least one trough, the deflecting member being angulated to generally follow the shape of the at least one trough;
      the deflector side of the deflecting member being positioned for deflecting ascending vapor away from downward flow of the liquid on the diffuser side; and
      wherein the deflecting member extends along a length of the selected side of the at least one trough and is constructed in a generally reverse L-shaped configuration such that a lower region thereof is generally perpendicular to and spaced from the diffuser plate.

6. The packed exchange tower of claim 5, wherein the one or more liquid flow distributors further include:
   a diffuser plate disposed beneath the at least one trough; and
   the deflecting member being adapted to discharge the liquid against the diffuser plate for uniformly distributing the liquid across the plurality of packing sections.

7. The packed exchange tower of claim 6, wherein the selected side is the first side of the at least one trough.

8. The packed exchange tower of claim 7, wherein the diffuser plate extends from the bottom region of the at least one trough.

9. The packed exchange tower of claim 6, wherein the selected side is the second side of the at least one trough.

10. The packed exchange tower of claim 9, wherein the diffuser plate extends from the bottom region of the at least one trough and is spaced from a lower region of the deflecting member.

11. The packed exchange tower of claim 10, wherein a lower region of the deflecting member is generally perpendicular to the diffuser plate.

* * * * *

UNITED STATES PATENT AND TRADEMARK OFFICE
CERTIFICATE OF CORRECTION

PATENT NO.       : 8,888,077 B1
APPLICATION NO.  : 13/564881
DATED            : November 18, 2014
INVENTOR(S)      : Ian G. Buttridge et al.

It is certified that error appears in the above-identified patent and that said Letters Patent is hereby corrected as shown below:

Title Page, item (75), Inventor Section    Replace "Soo Woong Kim" with
-- SooWoong Kim --

Signed and Sealed this
Thirty-first Day of March, 2015

Michelle K. Lee
*Director of the United States Patent and Trademark Office*